United States Patent [19]
Wheeler

[11] Patent Number: 5,885,036
[45] Date of Patent: Mar. 23, 1999

[54] HAND HELD DRILL PRESS AND METHOD OF USE

[76] Inventor: Bryce A. Wheeler, 80 Larkspur La., Mammoth Lakes, Calif. 93546

[21] Appl. No.: 991,582

[22] Filed: Dec. 16, 1997

[51] Int. Cl.[6] .................................................. B23B 35/00
[52] U.S. Cl. ......................... 408/1 R; 408/111; 408/136; 408/712
[58] Field of Search .................................. 408/1 R, 103, 408/108, 110, 111, 112, 136, 712

[56] References Cited

U.S. PATENT DOCUMENTS

| 2,629,267 | 2/1953 | Hart | 408/712 |
|---|---|---|---|
| 5,009,134 | 4/1991 | Sorensen et al. | 269/169 |
| 5,713,702 | 2/1998 | Turner | 408/111 |

FOREIGN PATENT DOCUMENTS

| 605902 | 6/1926 | France | 408/103 |
|---|---|---|---|
| 2432137 | 1/1976 | Germany | 408/103 |
| 2915429 | 10/1980 | Germany | 408/108 |
| 3120247 | 2/1983 | Germany | 408/111 |
| 4014210 | 11/1991 | Germany | 408/103 |

*Primary Examiner*—Daniel W. Howell
*Attorney, Agent, or Firm*—Timothy Thut Tyson; Freilich, Hornbaker & Rosen

[57] ABSTRACT

A hand held drill press (20) is shown for a drill motor (30) having a clamping collar (44) and a drill bit (26). The drill motor is mounted in a movable jaw (56) which is moved along a slide bar (52) toward a fixed jaw (54) by squeezing a trigger (58) against a handle (100) of the movable jaw. A work piece (24) placed between the fixed jaw and the drill bit is drilled as the trigger is squeezed.

5 Claims, 10 Drawing Sheets

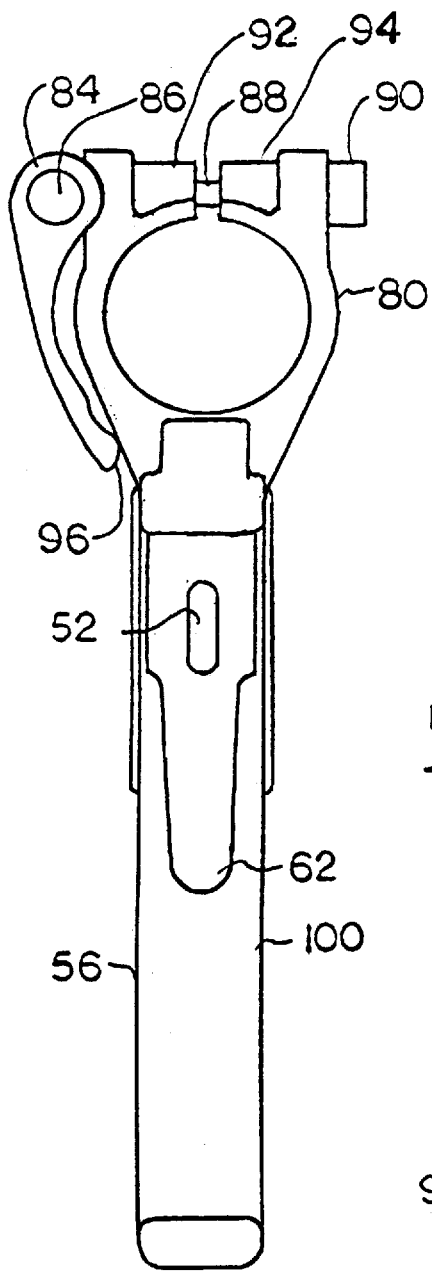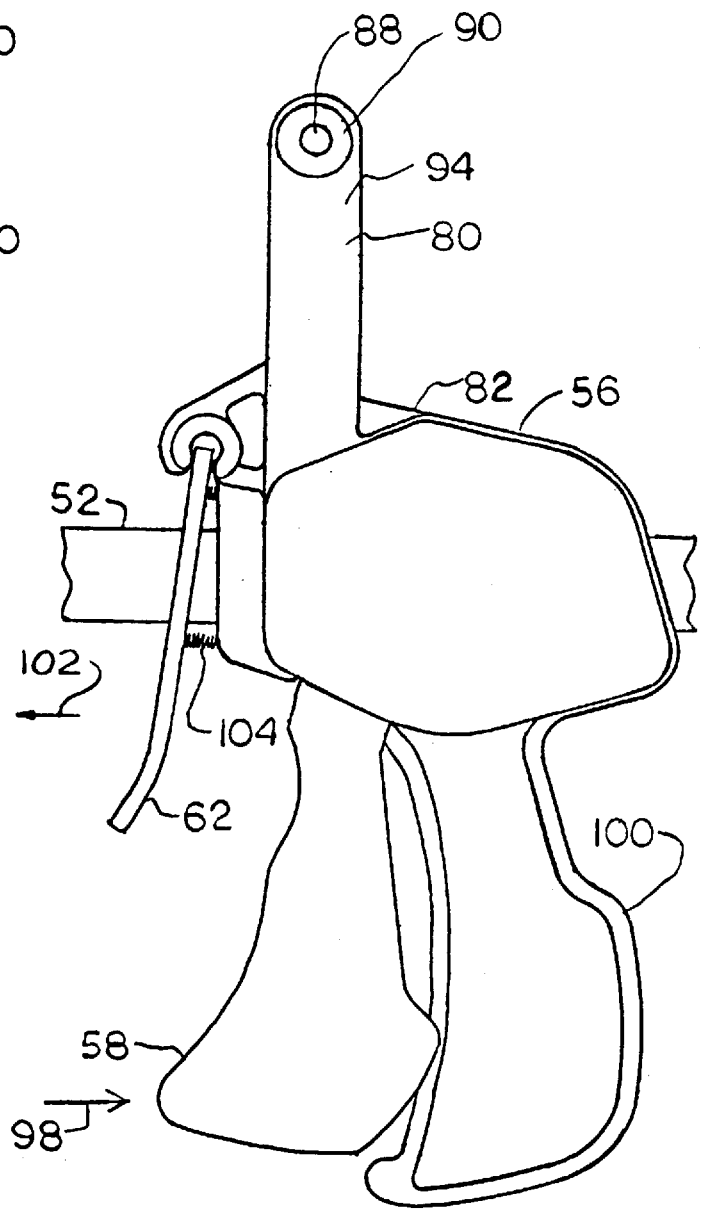
FIG. 4
FIG. 3

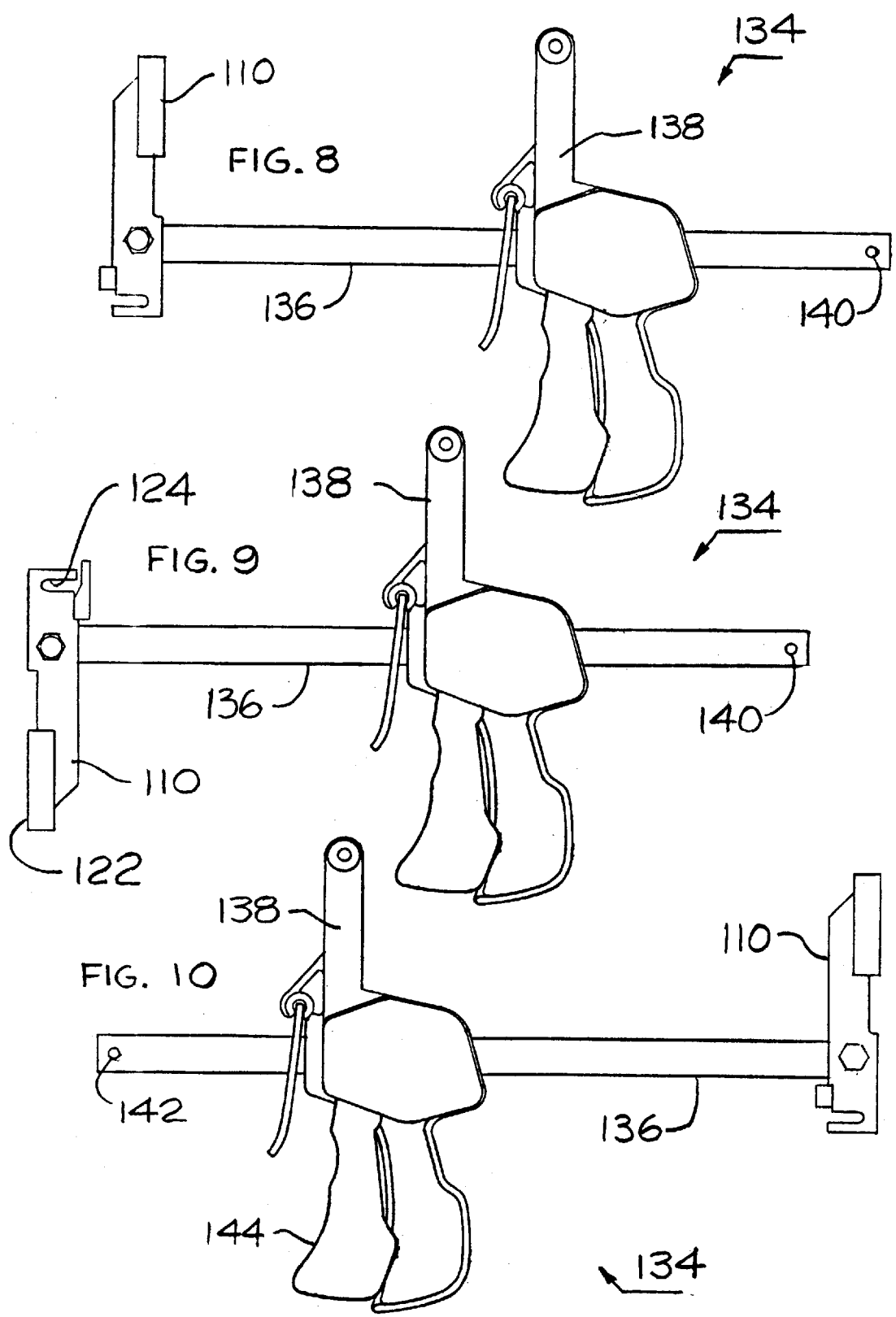

HAND HELD DRILL PRESS AND METHOD OF USE

TECHNICAL FIELD

The present invention pertains to the drilling art, and in particular to a hand held drill press and method of use.

BACKGROUND ART

When using a hand operated drill motor to drill a hole in a work piece, the operator presses against the handle of the drill motor to push the drill against the work piece. This is easy and safe to do when the work piece is below the operator and the operator can use his body weight as the source of the forward force. If the work piece is on a vertical surface such as a wall, the operator leans into the drill bit again using his body weight as the source of the forward force. However, if the operator is on a ladder and has to push against a wall, the operator and ladder tend to move backward possibly causing a dangerous condition. An overhead work piece requires the operator to use the muscles in his arms to push the drill up.

If the work piece can be moved to the drill, a drill press is ideal for drilling the hole. A table supports the work piece and a drill is forced into the work piece with the aid of a lever.

A drill press head having an electromagnetic base is available for work on steel construction. The electromagnet takes the place of the table and base of a regular drill press. When the operator wants to drill a hole in a large steel member, he moves the unit to the desired location and turns on the electromagnet which clamps the unit to the work piece. The head is then operated in the same manner as a drill press head to create the hole. When he is finished, the operator turns off the electromagnet which releases the unit from the work piece. This type of unit tends to be large and expensive and is useful only for steel construction.

Smaller hand drill press arrangements have been developed. U.S. Pat. No. 4,576,529 to Forrer shows a drill motor mounted on a bar for drilling a work piece held against a jaw member. Forward force for drilling is provided by a threaded spindle engaging a threaded aperture and rotated using a crank handle. The operator holds the drill motor with one hand while rotating the crank handle with the other. Rotation of the spindle with the crank is awkward, however, and tends to throw the drill to the side out of alignment with respect to a fixed work piece.

U.S. Pat. No. 4,860,735 to Davey et al. illustrates a guide for drilling along a line with a drill motor during surgery but does not have a forward moving means.

U.S. Pat. No. 5,314,271 to Christiano shows a portable drill guide based on a welder clamp type locking plier such as sold under the trademark VISE GRIP®. It is primarily used for drilling out spot welds in sheet metal. The drill motor is mounted on one of the jaws perpendicular to the opposite jaw. A work piece is drilled between the end of the drill and the opposite jaw while the operator squeezes the locking plier handles with one hand and holds the drill motor with the other. The thickness of the work piece is seriously limited.

U.S. Pat. No. 5,322,397 to Spear shows a stand for drilling overhead. The stand is jacked between a floor and the overhead work piece. The drill motor on the stand is pushed into the overhead work piece using a lever.

All of the devices shown in the referenced patents are difficult to use or are useful only in limited circumstances. A hand drill press that could be operated by one hand while the operator uses his other hand to hold the work piece or himself would be an improvement.

Slide bar clamps sold under the trademark QUICK-GRIP® by Peterson Manufacturing Co., Inc. of DeWitt, Nebr., provide linear clamping force along a slide bar between a moving jaw held by one hand and a fixed jaw as shown in U.S. Utility Pat. Nos. 4,926,722; 5,009,134; and 5,022,137, and U.S. Design Pat. No. 320,919. As the operator repeatedly squeezes the trigger on the movable jaw, the movable jaw walks along the slide bar in a linear fashion toward the fixed jaw. Each squeezing of the trigger moves the movable jaw only slightly forward translating the gripping force of the hand into significant forward force due to the leverage provided by the trigger mechanism. The operator can readily determine the amount of clamping force applied between the movable jaw and the fixed jaw by how hard he squeezes the trigger.

QUICK-GRIP® clamps are sold to clamp work pieces for gluing and assembly. A significant advantage of QUICK-GRIP® clamps over other clamps is that they can be operated entirely by one hand while the operator uses his other hand to control the work piece. Most other portable clamps require two hands to operate. Another significant advantage is that the force applied by the clamps is always linear between their movable jaws and fixed jaws. Other clamps usually are applied using torque which tends to throw them to the side or rotate them during application. No suggestion is made for any method of using such slide bar clamps with drill motors.

DISCLOSURE OF INVENTION

The present invention combines the features of a trigger operated slide bar clamp such as the Quick-Grip slide bar clamp with a drill motor. The combination allows a work piece to be drilled with one hand while holding the work piece between the drill and a fixed jaw. A drill motor is attached to the movable jaw. As the trigger mechanism is repeatedly squeezed by the operator, the movable jaw walks along the slide bar causing the drill bit to be positioned against the work piece. As the drilling of the work piece begins, the leverage inside the trigger mechanism amplifies the force of the operator's hand to cause considerable force to be exerted by the drill bit on the work piece in the direction of the fixed jaw. The amount of force on the drill bit is readily adjusted by the operator by how hard he squeezes the trigger.

In accordance with an important feature of the invention, a split cylindrical clamp is positioned on the movable jaw to hold the cylindrical collar provided on most small drill motors near the chuck. A drill motor is easily slid into the split cylindrical clamp and held in place by the clamp. When the job is finished, the split cylindrical clamp is released allowing the drill motor to be withdrawn from the invention for other uses.

In accordance with an important aspect of the invention, the split cylindrical clamp includes a cam activated clamping lever allowing the split cylindrical clamp to be engaged or disengaged by the single movement of the lever.

In accordance with a preferred embodiment of the present invention, the fixed jaw of the slide bar clamp is reversible on the slide bar allowing the hand held drill press to be used between structures such as studs in a wall.

In accordance with an important feature of the invention, a slot is provided in the fixed jaw perpendicular to the slide bar. The slot is sized to fit the slide bar of a slide bar clamp.

This allows the hand held drill press to be position in the middle of a large work piece while being held in place by the slide bar clamp which is attached on the sides of the large work piece.

Other features and advantages of the present invention will become apparent from the following detailed description, taken in conjunction with the accompanying drawings, which illustrate, by way of example, the principles of the invention.

BRIEF DESCRIPTION OF DRAWINGS

FIG. 3 is a left side elevation view of the movable jaw of the present invention;

FIG. 4 is a front elevation view of the movable jaw;

FIG. 8 is a left side elevation view of the second embodiment of the press only of the present invention similar to FIG. 5 without a drill motor;

FIG. 9 is a left side elevation view similar to FIG. 8 with the fixed jaw inverted and reversed;

FIG. 10 is a left side elevation view similar to FIG. 8 with the fixed jaw moved to the other end of the slide bar;

MODES FOR CARRYING OUT THE INVENTION

Figure 1:
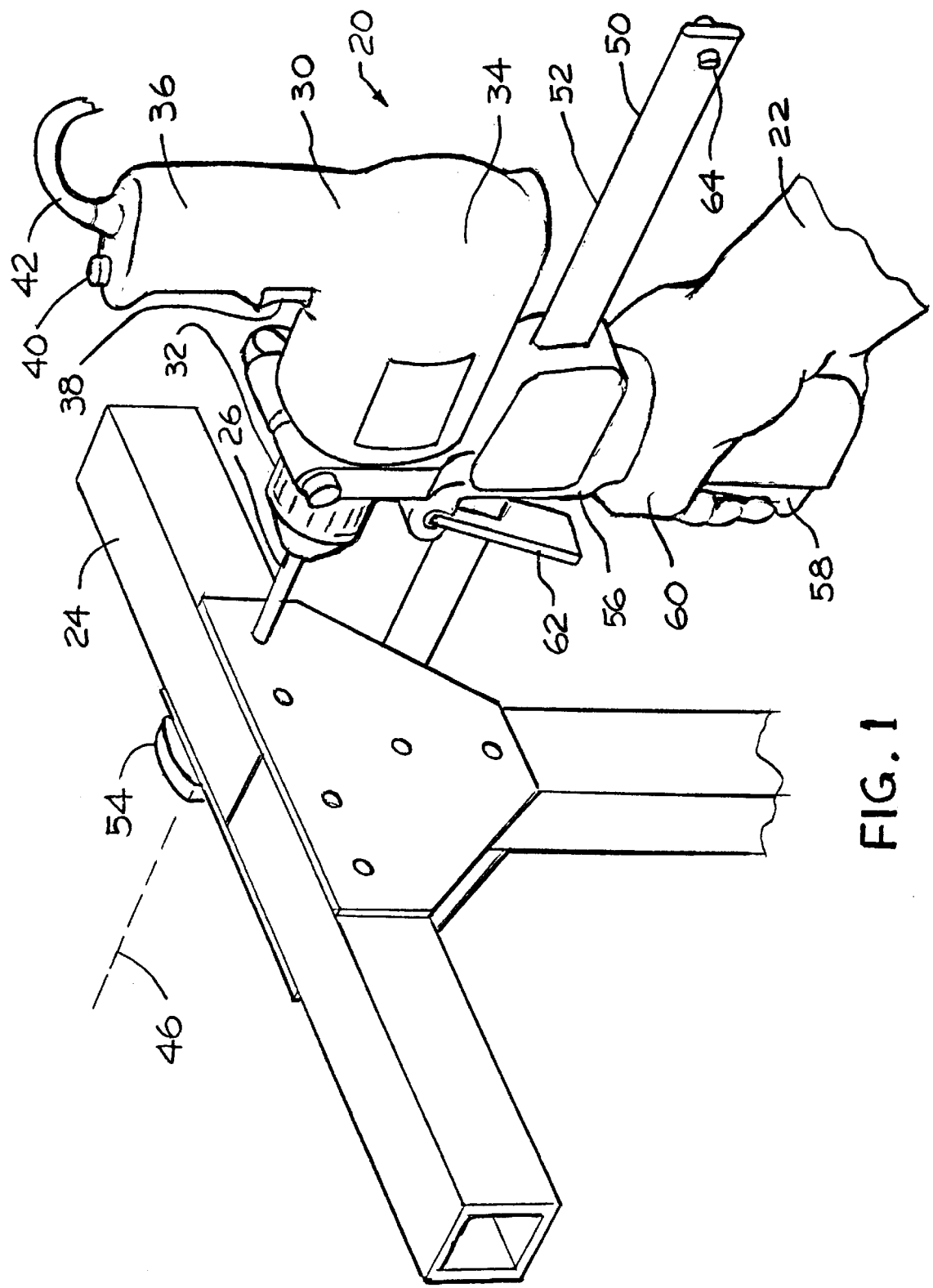
FIG. 1 is a top rear left side perspective view of hand held drill press drilling a hole in a work piece in accordance with the present invention.

Referring initially to FIG. 1, a top rear left side perspective view is shown of hand held drill press in accordance with the present invention, generally designated as 20. The operator 22 is drilling a hole in a work piece 24 using a drill bit 26.

The hand held drill press 20 includes two major components. The first major component is a hand held electric drill motor 30 which has a chuck 32 for holding the drill bit 26, a body 34 containing an electric motor, a handle 36, an electric switch 38 for operating the drill motor, a stop 40 for retaining the switch 38 in a closed position, and an electric cord 42 for supplying power from an electric wall outlet or other source.

Figure 2:
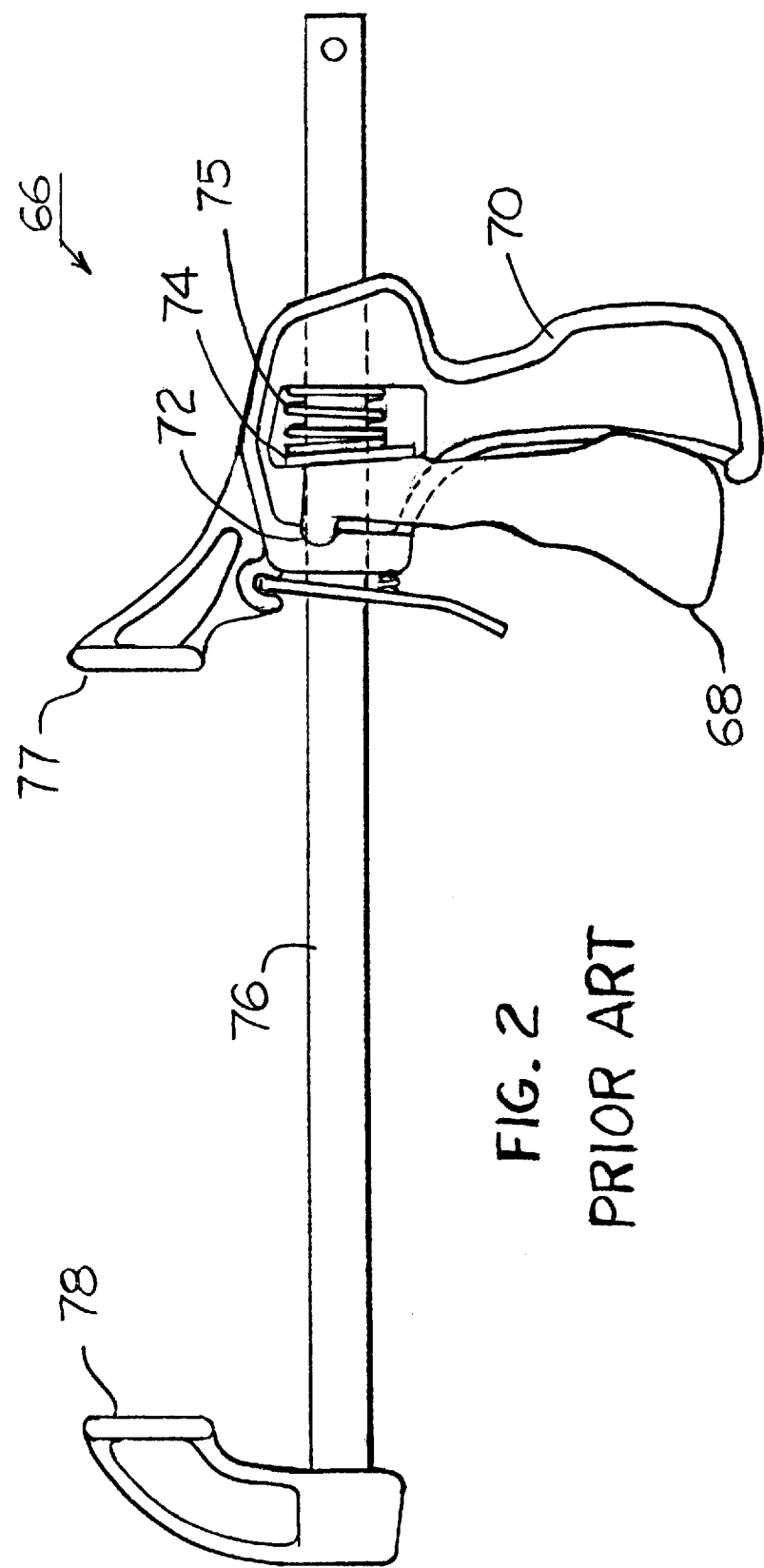
FIG. 2 is left side elevation view of a prior art trigger operated slide bar clamp.
Figure 2A:
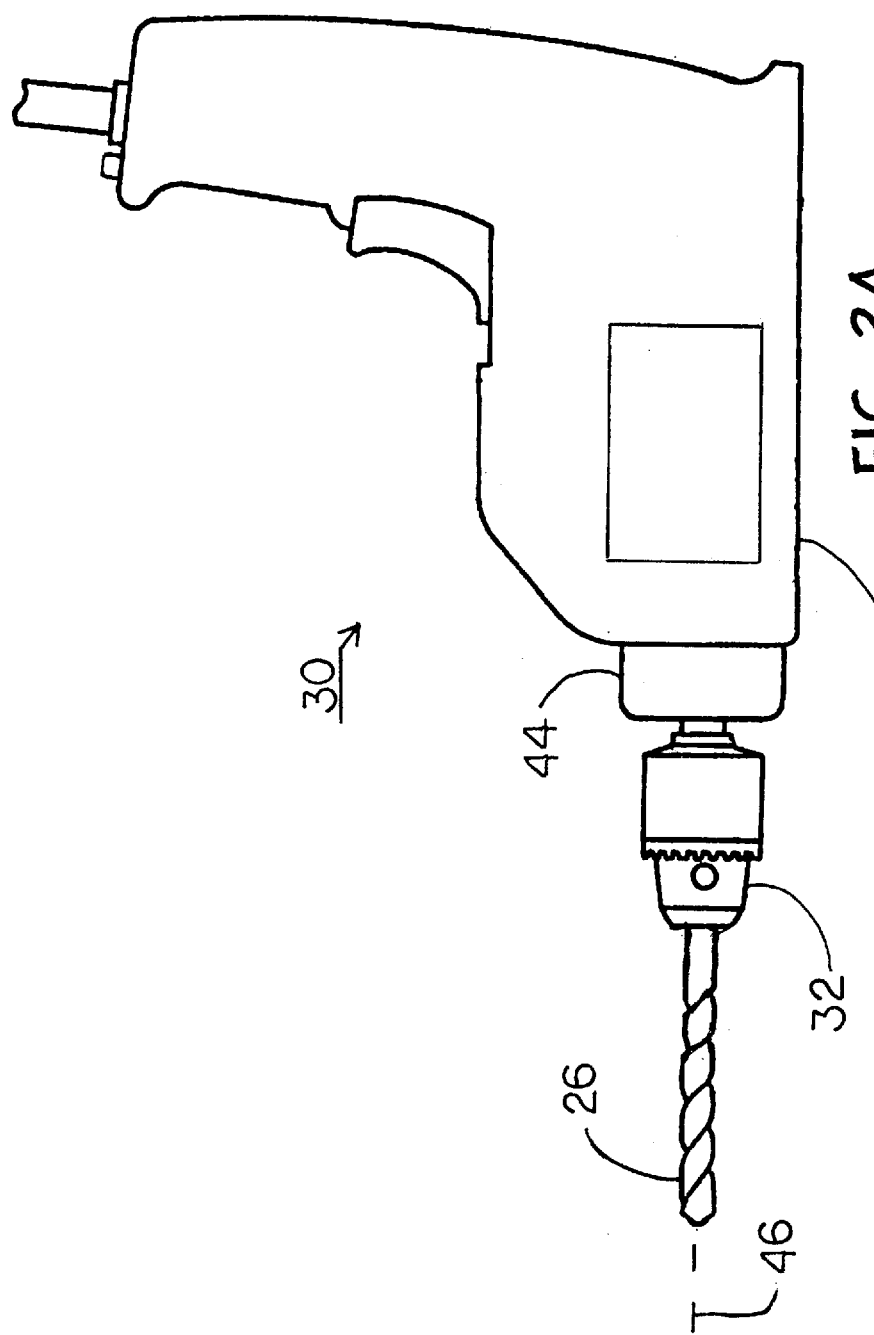
FIG. 2A is a right side elevation view of a prior art drill motor and drill bit.

A cylindrical collar 44 is provided on the outer surface of the drill motor 30 between chuck 32 and body 34 and can be seen in FIG. 2A. Cylindrical collars in this position are included on most small hand held electric drill motors for the attachment of side handles used to stabilize the drill motors during some drilling operations. The side handles attach to the drill motors using split cylindrical clamps which compress onto the collars. The diameter of the collars of most of the different brands of drill motors is substantially 4.25 cm. which is only slightly larger than the diameter of a standard chuck which is 4 cm. This allows the side handles to be easily slid on and off of the drill motors as needed. The substantial standardization of the diameter of the collars at 4.25 cm. allows the complete interchange of most electric drill motors in the hand held drill press 20 of the present invention.

The second major component of the hand held drill press 20 is the slide bar clamp 50. The slide bar clamp 50 includes a slide bar 52, a fixed jaw 54, and a movable jaw 56. The fixed jaw 54 is hidden by the work piece 24 in FIG. 1 and is better seen in FIG. 5. The fixed jaw 54 is rigidly secured to the slide bar by a pin which is not shown. The movable jaw 56 moves along the slide bar 52 as the trigger 58 is squeezed by the operator's hand 60. A locking lever 62 holds the movable jaw 56 in place on the slide bar 52 when the trigger is no longer being squeezed. If a work piece is between the movable jaw and the fixed jaw as shown in FIG. 1, the locking lever 62 holds the movable jaw against the work piece. The movable jaw is released from the work piece by pulling the locking lever 62 toward the trigger 58. The movable jaw 56 then readily slides backwards on the slide bar 52 allowing the hand held drill press to be removed from the work piece. A pin 64 on the rear end of the slide bar 52 keeps the movable jaw 56 from passing off the slide bar. Full details of the internal trigger mechanism and operation of the movable jaw 56 and slide bar 52 are given in U.S. Pat. Nos. 4,926,722; 5,009,134; and 5,022,137 which are incorporated herein by reference.

FIG. 2 is left side elevation view of the prior art trigger operated slide bar clamp 66 sold under the trademark QUICK-GRIP®. When the trigger 68 is squeezed toward the handle 70, it rotates about a pivot 72 pushing against a metal plate 74 and spring 75. Slide bar 76 passes through a slot in plate 74, When trigger 68 is squeezed toward handle 70, metal plate 74 binds against slide bar 76 moving movable jaw 77 toward fixed jaw 78 in a process more fully describe in U.S. Pat. No. 4,926,722 which is incorporated herein by reference. The trigger mechanism of clamp 66 includes the trigger, handle, pivot, metal plate and spring.

FIG. 2A is a right side elevation view of a prior art drill motor 30 and drill bit 26 having the cylindrical collar 44 between the chuck 32 and the body 34.

FIG. 3 is a left side elevation view of the movable jaw 56 of the present invention and FIG. 4 is a front elevation view. The prior art movable jaw 74 shown in FIG. 2 is modified to hold a hand held electric drill motor as shown in FIG. 1. A split cylindrical clamp 80, as best seen in FIG. 4, is positioned on top of the sliding body member 82 and provides a means for holding cylindrical collar 44 on the front of the drill body 34 (FIG. 2A) to position the axis of drill bit 26 (FIG. 1) parallel to the slide rod 52. A quick clamp and release binder 84 having a lever activated cam 86 attached to a bolt 88 and adjustable nut 90 is used to pull the sides 92 and 94 of the split cylindrical clamp 80 together to clamp the drill motor. The diameter of the cylindrical clamp in the non-tightened position is slightly larger than the diameter of the collar of a drill motor allowing the drill motor to be easily slipped into the clamp 80. The lever activated cam 86 is shown in the tightened position in FIG. 4 and is released by lifting the outer end 96. Cam action binders similar to binder 84 are widely used for securing bicycle seats to bicycle frames. After the drill motor is placed in the cylindrical clamp 80 and the lever activated cam 86 tightened, the operator squeezes the trigger 58 in the direction of arrow 98 against the handle 100 of the movable jaw 56 to progressively move it along the slide bar 52 in the direction of arrow 102. The trigger mechanism inside movable jaw 56 is the same as the trigger mechanism inside movable jaw 77 of FIG. 2 which is incorporated herein by reference. This action forces the drill bit 26 shown in FIG. 1 into the work piece 24 until the hole is completed. The operator then squeezes locking lever 62 against spring 104 to release the grip of the locking lever on the slide bar 52 allowing the movable jaw with the drill motor and drill bit to be moved away from the work piece.

Figure 5:
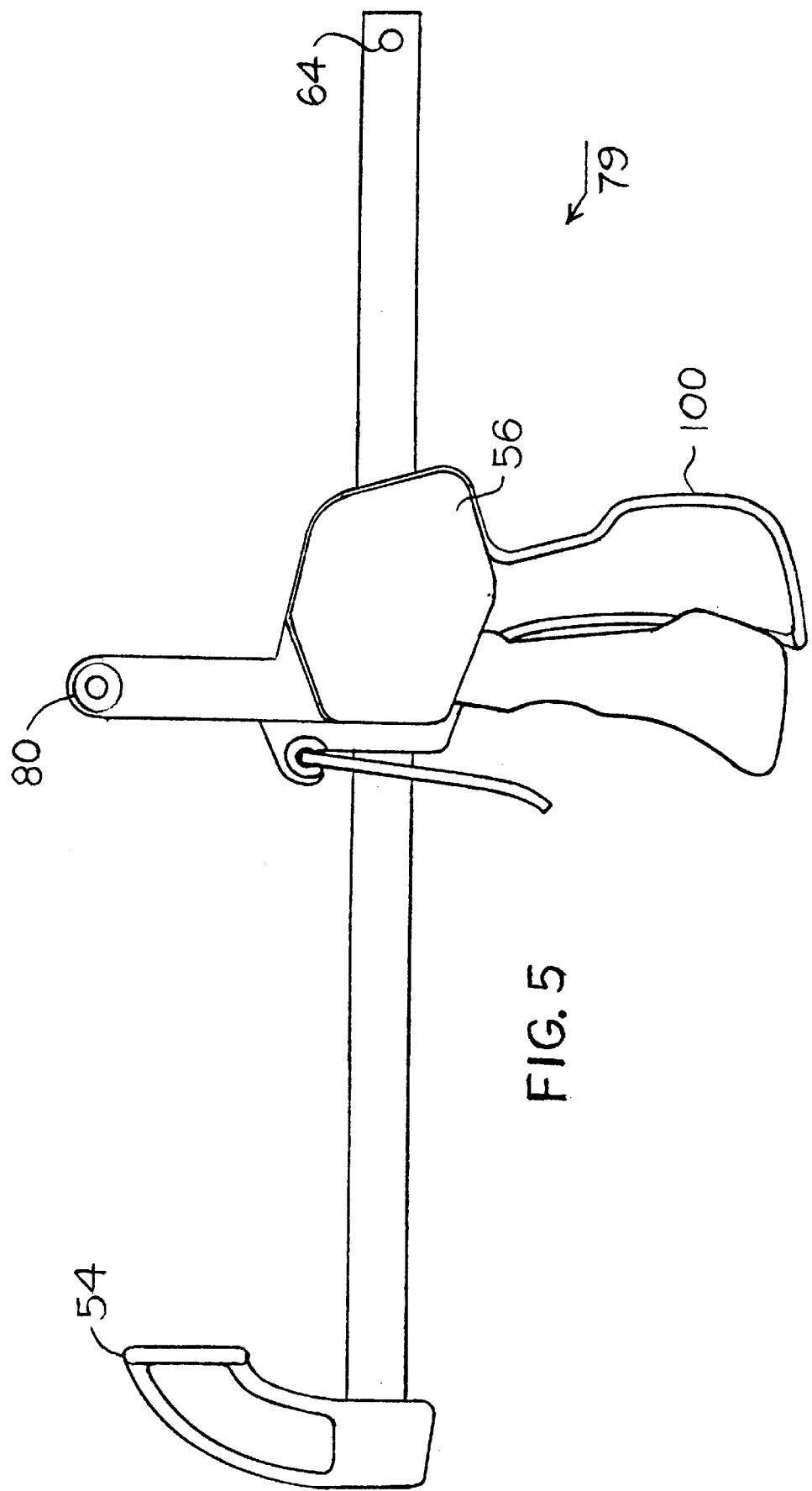
FIG. 5 is left side elevation view of the press only of the present invention without a drill motor.

FIG. 5 is left side elevation view of the press 79 only of the hand held drill press 20 without a drill motor. The cylindrical clamp 80 provides a means for mounting the handle 36 of the drill motor 30 at many convenient angles with respect to the handle 100 of the movable jaw 56. In FIG. 1, the handle 36 is in the same plane as the handle 100. This is usually the most stable position for hand drilling as shown in the bottom drilling arrangement of FIG. 11 because the operator can position his arms and body equally behind the two handles. If the drilling space is constricted, the handle 36 can be mounted at 90° to handle 100 as shown in the drilling arrangement shown on the left side of FIG. 12.

Figure 6:
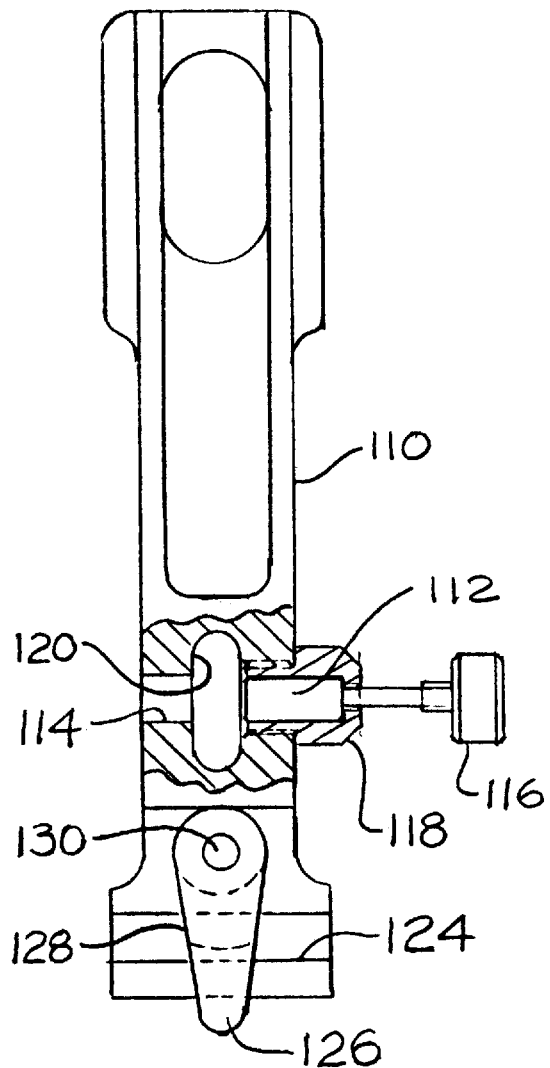
FIG. 6 is partial sectional front elevation view of a second embodiment of a fixed jaw.

FIG. 6 is a partial sectional front elevation view of a removable second embodiment of a fixed jaw 110. The first embodiment of the fixed jaw 54 shown in FIG. 5 is permanently attached to the slide bar 52 by cast material through a hole similar to the hole 142 in the end of the slide bar in FIG. 10. In contrast, fixed jaw 110 is removable because it is attached to a slide bar by means of a removable bolt or slip pin 112 which passes into a pin chamber 114. Slip pin 112 is manipulated in pin chamber 114 by means of a knob 116 positioned outside of a retaining collar 118. The partial sectional view of FIG. 6 is along the axis of slip pin 112. When knob 116 is pulled to the right as shown in FIG. 6, slip pin 112 clears the edge of slide bar hole 120 as shown allowing fixed jaw 110 to be pulled off the slide bar. The fixed jaw 110 can then be turned around or upside down as desired and replaced on either end of the slide bar. The knob 116 is then pushed to the left passing through a pin hole in the slide bar securing the fixed jaw 110 in a new position.

Figure 7:
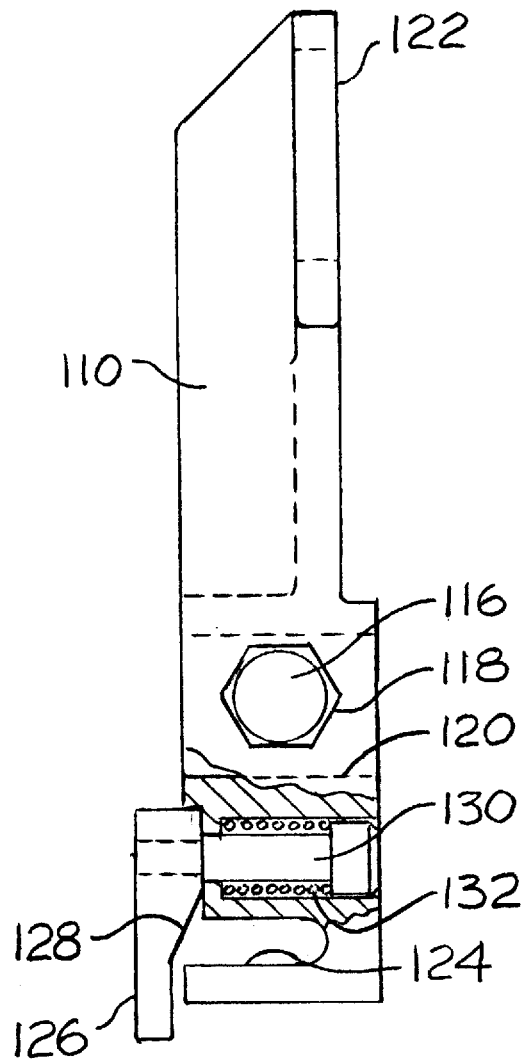
FIG. 7 is a partial sectional left side elevation view of the second embodiment of the fixed jaw.
Figure 11:
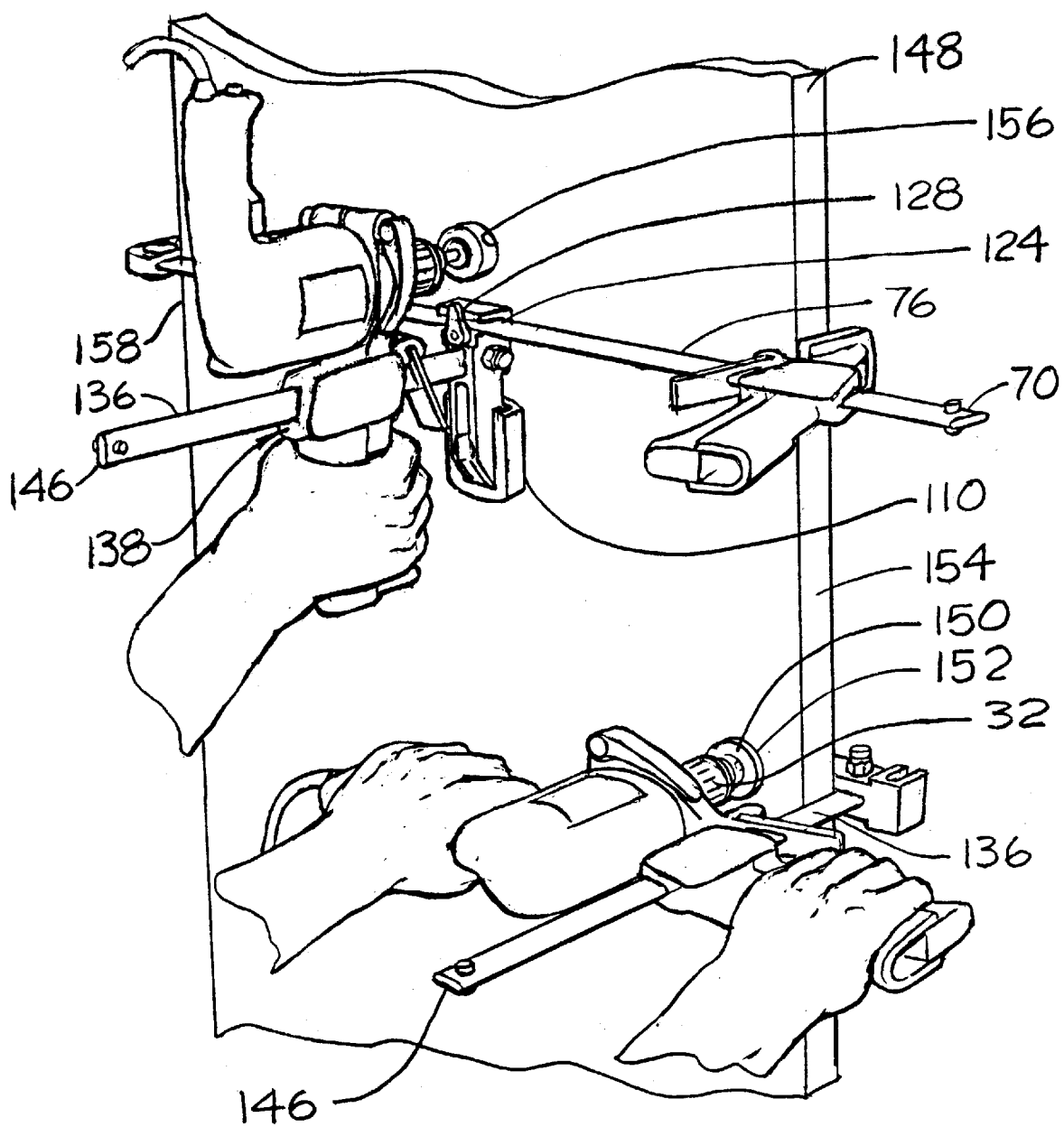
FIG. 11 shows top rear right side perspective views of two hand held drill presses drilling on a door.
Figure 12:
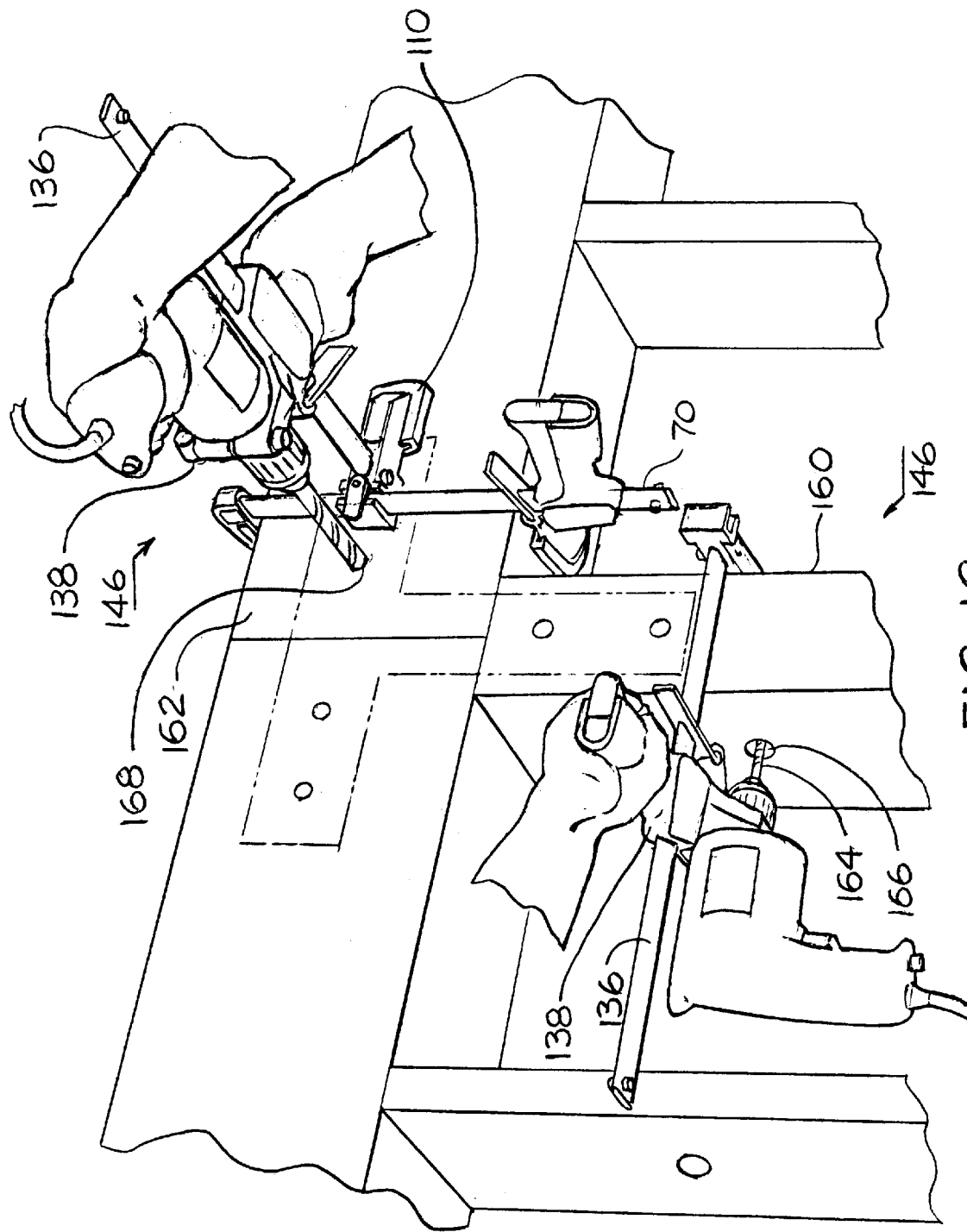
FIG. 12 shows bottom rear left side perspective views of two hand held drill presses making deep holes in beams; and, FIG. 13 shows a top rear left side perspective view of the arrangement of FIG. 10 being used between wide studs.

FIG. 7 is a partial sectional left side elevation view of fixed jaw 110. A slot 124 perpendicular to face 122 is provided for use with a slide bar clamp such as slide bar clamp 70 shown in FIG. 2. There are many instances where the reach of the hand held drill press is not sufficient to drill a hole at the desired location in a work piece. A slide bar clamp 70 is then placed on the large object such a door or beam and the fixed jaw 110 of the hand held drill press is attached to the slide bar clamp by means of the slot 124 as shown in FIGS. 11 and 12. A swivel clamp 126 provides a slot retaining means for holding the slide bar 76 in perpendicular slot 124. Swivel clamp 126 includes a swivel plate 128 which is rotated about a swivel bolt 130 over slot 124. A spring 132 urges swivel plate 128 toward slot 124. The partial sectional view of FIG. 7 is along the axis of swivel bolt 130.

FIG. 8 is a left side elevation view similar to FIG. 5 showing a second embodiment of the press 134 without a drill motor. Fixed jaw 110 is attached to the end of a slide bar 136. The movable jaw 138 operates in the same manner as movable jaw 56 of FIG. 5. Instead of having a pin 64 in the end of the slide bar as shown in FIG. 1, a pin hole 140 is provide for use by slip pin 112 of fixed jaw 110. A similar pin hole 142 shown in FIG. 10 is provided on the other end of slide bar 136 for use by slip pin 112. The configuration of press 134 shown in FIG. 8 operates in the same manner as press 79 shown in FIG. 5.

FIG. 9 is a left side elevation view similar to FIG. 8 with fixed jaw 110 inverted and reversed placing the face 122 toward the work piece that is to be drilled. The conversion from the configuration in FIG. 8 is achieved by pulling knob 116 to withdraw slide pin 112 (FIG. 6) from pin hole 142 (FIG. 10) allowing fixed jaw 110 to be pulled off the end of slide bar 136. Fixed jaw 110 is then reinstalled on slide bar 136 in the position shown in FIG. 9 and knob 116 is pushed in to force slide pin 112 into pin hole 142 securing the fixed jaw on the slide bar. In this position, slot 124 is turned toward movable jaw 138 so that it can be used with a trigger operated slide bar clamp such as clamp 70 of FIG. 2 to drill large work pieces as described below in conjunction with FIGS. 11 and 12.

FIG. 10 is a left side elevation view similar to FIG. 8 with the fixed jaw 110 moved to the other end of slide bar 136 behind movable jaw 138. Removal of fixed jaw 110 from the position shown in FIG. 8 and installation on the other end of slide bar 136 using pin hole 140 is achieved in the same manner as described in conjunction with FIG. 9. In the position shown in FIG. 10, press 134 can be used to drill between two objects by pressing against the rear object with fixed jaw 110 and squeezing the trigger 144 on movable jaw 138 to move the fixed jaw away from the movable jaw as discussed below in conjunction with FIG. 13.

FIG. 11 shows top rear right side perspective views of two hand held drill presses 146 drilling on a door 148. Each hand held drill press 146 includes a press 134 and a drill motor 30. The lower hand held drill press 146 is being used with a hole saw 150 to make the hole 152 for a lock tumbler or handle adjacent the edge 154 of the door 148. The reach of hand held drill press 146 is limited to the height of the drill bit axis 46 off the slide bar 136. When a hole needs to be drilled further away from the edge of a work piece such as for a peep hole 156 in the middle of the door 148, a slide bar clamp 70 is selected which will reach from the edge 154 to the other edge 158. The fixed jaw 110 of the upper hand held drill press 146 is then turned upside down on the slide bar 136 facing away from the movable jaw 138. Slide bar 76 of the slide bar clamp 70 is pressed into the perpendicular slot 124 and the swivel plate 128 is swung over it to hold it in place. The operator can move the slide bar clamp 70 up and down the edges of the door to reach the ideal location before clamping it to the door. Likewise, the operator can move the fixed clamp 110 from left to right on the slide bar 76 to reach the ideal location before the swivel plate 128 is rotated in place. Once the hand drill press 146 is positioned at the ideal location, the operator can drill hole 156.

FIG. 12 shows bottom rear left side perspective views of two hand held drill presses 146 drilling deep holes in beams 160 and 162. Lower hand held drill press 146 is being used with a spade type hole drill 164 to make a deep hole 166 through beam 160 for electrical conduit. The drill 164 is conveniently and safely pushed through beam 160 by movable jaw 138 working against slide bar 136.

The position of the hole 168 in beam 162 is too far from the edge for upper hand held drill press 146 to be used by itself. Instead the fixed end 110 is inverted and reversed on slide bar 136 and the drill press 146 is used with a slide bar clamp 70 in the middle of beam 162 in the manner described above in conjunction with FIG. 11. Again the length of slide bar 136 greatly facilitates the drilling of the deep hole 168 because movable jaw 138 is equally forceful at all locations along the slide bar.

Figure 13:
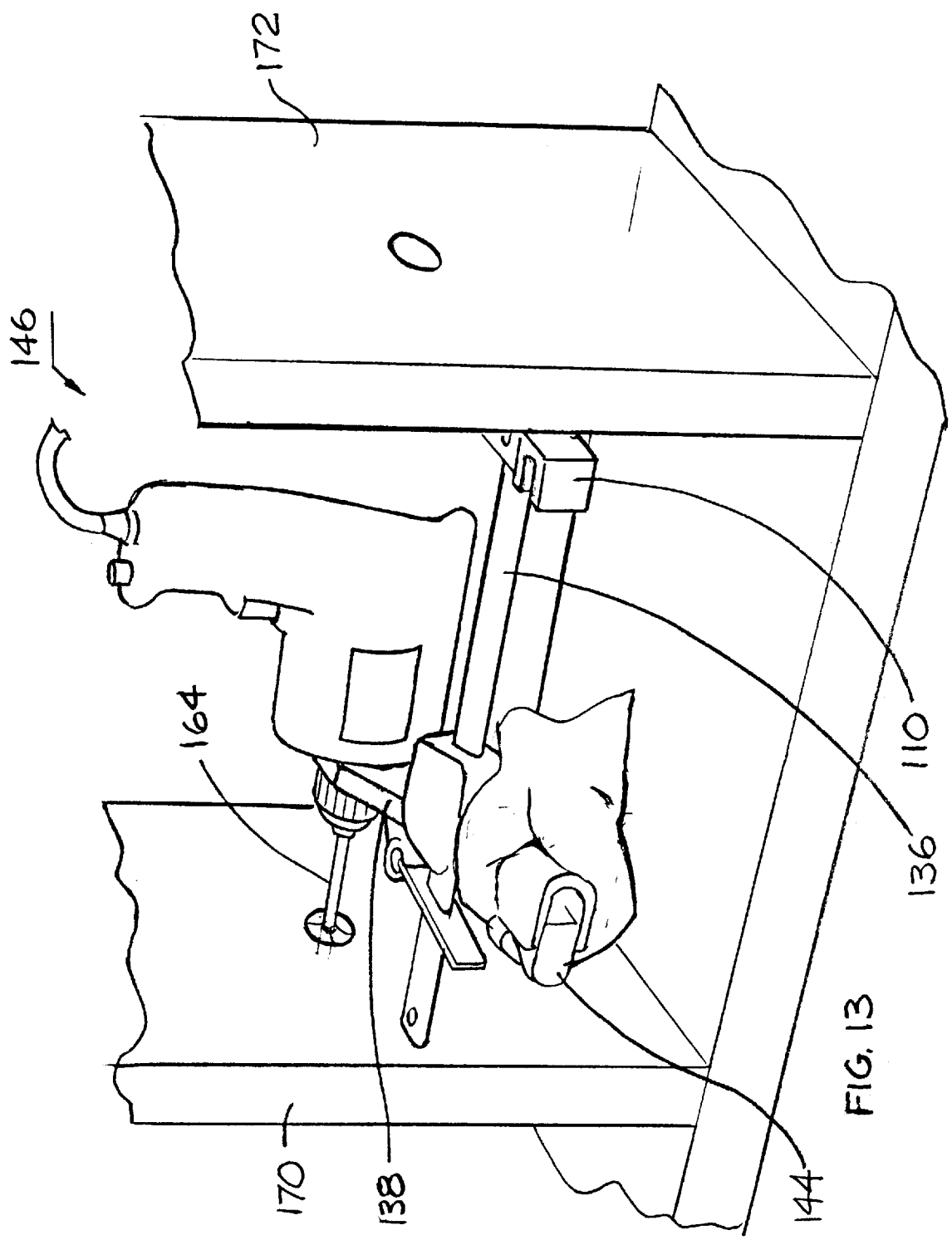

FIG. 13 shows a top rear left side perspective view of and held drill press 146 having press 134 arranged as shown in FIG. 10 being used between wide studs 170 and 172. Fixed jaw 110 is reversed on slide bar 136 with its face (not shown) pressing against the inside of stud 172. Spade drill 164 is pressed into stud 170 when the operator squeezes trigger 144 moving movable jaw 138 along slide bar 136.

The preferred embodiments of the invention described herein are exemplary and numerous modifications, dimensional variations, and rearrangements can be readily envisioned to achieve an equivalent result, all of which are intended to be embraced within the scope of the appended claims.

I claim:

1. A method for drilling a work piece with a combination of a hand held drill press and trigger operated bar clamp, comprising the steps of:

providing a work piece, a drill motor having a clamping collar and a chuck with a drill bit axis, a drill bit, a press having a press slide bar, a fixed jaw mounted on said press slide bar having a slot perpendicular to said press slide bar, a movable jaw mounted on said press slide bar having a trigger mechanism moving said movable jaw along said press slide bar when squeezed and a clamp for clamping said clamping collar of said hand held drill with said drill bit axis parallel to said slide bar, and a trigger operated bar clamp having a clamp slide bar;

inserting said clamp slide bar into said perpendicular slot;

clamping said trigger operated bar clamp on said work piece, said drill bit in said chuck, and said drill motor in said clamp;

operating said drill motor to rotate said drill bit; and, squeezing said trigger mechanism to move said movable jaw along said press slide bar toward said fixed jaw and said drill bit into said work piece.

2. A combination of a press for a hand held drill having clamping collar and a chuck with a drill bit axis and a rigger operated bar clamp, comprising:

press having:

a press slide bar;

a fixed jaw mounted on said press slide bar and having a slot perpendicular to said press slide bar;

a movable jaw mounted on said slide bar and having a trigger mechanism moving said movable jaw along said slide bar when squeezed, and, a clamp for clamping the clamping collar of the hand held drill with the drill bit axis parallel to said slide bar; and, a trigger operated bar clamp having a clamp slide bar retained in said perpendicular slot.

3. A hand held drill press according to claim 2, wherein said fixed jaw further includes a swivel clamp over said perpendicular slot.

4. A press for a hand held drill having a clamping collar and a chuck with a drill bit axis, comprising:

a slide bar;

a fixed jaw mounted on said slide bar;

a movable jaw mounted on said slide bar and having a trigger mechanism moving said movable jaw along said slide bar when squeezed; and, one of said fixed and movable jaws having a split cylindrical quick clamp and release binder including a lever operated cam and bolt for clamping the clamping collar of the hand held drill with the drill bit axis parallel to said slide bar.

5. A press for a hand held drill having a clamping collar and a chuck with a drill bit axis, comprising:

a slide bar;

a fixed jaw removably mounted on said slide bar including a slot perpendicular to said slide bar and a swivel clamp over said perpendicular slot;

a movable jaw mounted on said slide bar and having a trigger mechanism moving said movable jaw along said slide bar when squeezed; and, one of said fixed and movable jaws having a split cylindrical clamp for clamping the clamping collar of the hand held drill with the drill bit axis parallel to said slide bar.

* * * * *